United States Patent [19]

Basile et al.

[11] Patent Number: 4,633,202

[45] Date of Patent: Dec. 30, 1986

[54] LOCAL AREA NETWORK SYSTEM WITH CONSTANT TAP LEVEL

[75] Inventors: Philip C. Basile, Gloucester County, N.J.; Eugene J. Kennedy, Lower Bucks County, Pa.

[73] Assignee: RCA Corporation, Princeton, N.J.

[21] Appl. No.: 685,724

[22] Filed: Dec. 24, 1984

[51] Int. Cl.$^4$ .......................... H01P 5/16; H03H 7/48
[52] U.S. Cl. .......................................... 333/109; 455/5; 340/825.05
[58] Field of Search ............... 333/109, 112, 117, 119, 333/124, 136; 455/3, 6, 14, 5; 370/124, 85; 340/825.05

[56] References Cited

U.S. PATENT DOCUMENTS

| | | | |
|---|---|---|---|
| 3,619,504 | 11/1971 | De Veer | 333/109 X |
| 3,747,028 | 7/1973 | Pennypacker | 333/112 |
| 4,079,319 | 3/1978 | Bracke | 333/109 X |
| 4,556,881 | 12/1985 | Basile | 340/825 |

FOREIGN PATENT DOCUMENTS 2419173  10/1975  Fed. Rep. of Germany ...... 333/109

Primary Examiner—Eugene R. LaRoche
Assistant Examiner—Benny T. Lee
Attorney, Agent, or Firm—Joseph S. Tripoli; Robert L. Troike; C. L. Maginniss

[57] ABSTRACT

A passive, single cable, local area network system includes two directional couplers at each cable tap to provide bi-directional communications for each communications terminal. Each coupler introduces some amount of signal power loss through the cable such that the signal power level between any two communicating terminals depends on the cable distance between them, measured in number of intervening cable taps. Selectable attenuators are provided between the directional couplers and the corresponding communications terminals to virtually equalize the signal power level between any two terminals. The value of attenuation is selected according to a relationship including the number of cable taps in the system, the signal power loss along the cable introduced by each directional coupler, and the ordinal number of the corresponding terminal from the cable termination in the direction toward which the terminal's directional coupler communicates.

8 Claims, 4 Drawing Figures

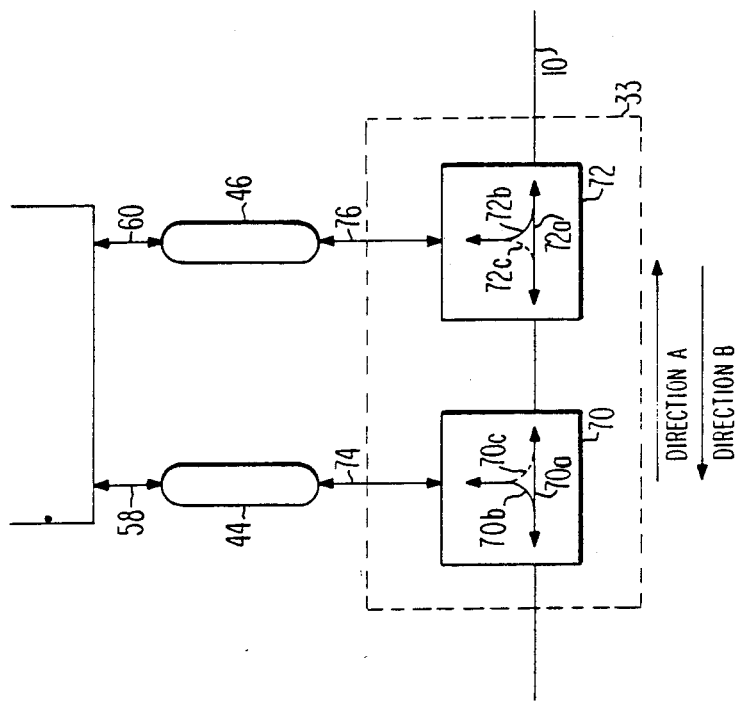
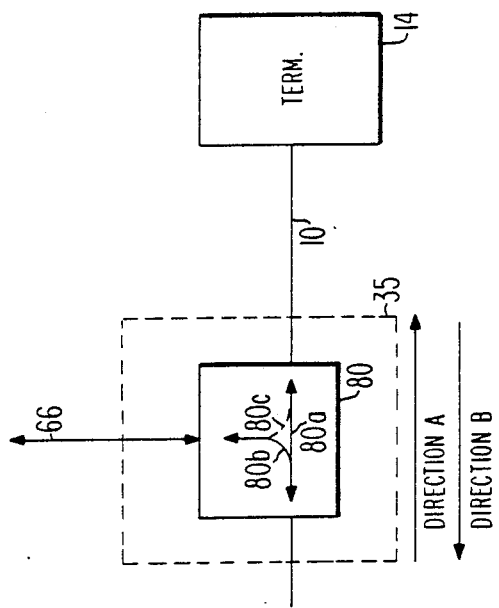
Fig. 2
Fig. 3

LOCAL AREA NETWORK SYSTEM WITH CONSTANT TAP LEVEL

The present invention relates to communications systems and, more particularly, to a passive, single cable, bi-directional local area network system with constant tap level to provide a reduced dynamic range.

Local area networks are being used with increasing frequency to satisfy the internal communications needs of businesses, hospitals, ships, aircraft, and the like. In an effort to reduce costs and increase reliability in these systems, various configurations have been suggested. It is known that a system incorporating a single, bi-directional bus reduces cost over a two-bus system, and that the use of passive taps for coupling terminals for communications over the bus enhances reliability when compared with a system using active taps.

It is known that active taps can be coupled to a bus without injecting loss. See, for example, U.S. Pat. No. 4,556,881. "ACTIVE, BIDIRECTIONAL BUS TAP," issued Dec. 3, 1985, to P. C. Basile, and assigned to the same assignee as the present invention. On the other hand, a passive tap, while exhibiting the advantage of improved reliability, does introduce a measurable amount of signal loss along the bus. While the loss through each tap may typically be as little as one db, a system having fifty or so taps would have a 50 db loss distributed along the length of the bus. Thus, a receiver in a terminal at one end of the bus would have to accept signals from both the adjacent terminal and one coupled at the far end of the bus, a difference in signal level of approximately 50 db, in this example. This ratio of maximum signal level to minimum signal level is referred to as the dynamic range.

The amplifiers which are used in an active bus system compensate for the tap loss and thus reduce the dynamic range on the bus, thereby permitting a cost effective receiver design. Alternatively, the dynamic range problem inherent in a passive bus system may be significantly reduced by the use of a two-bus system which can include a level shifter at its head end where the two buses meet. Nevertheless, the dynamic range problem has, until now, remained an impediment to cost effective design of a passive bus system in which the single-bus configuration is desired for cost and reliability considerations.

In accordance with the principles of the present invention, an apparatus is disclosed for use in a system for providing intercommunications among N communications terminals. The system includes a cable having first and second terminations, and N taps linearly disposed along the cable between the terminations for coupling the N communications terminals to the cable. In this system N−2 of the N taps are not adjacent the first or second terminations. Each one of these N−2 taps comprises first and second directional couplers. The first directional coupler couples a communications terminal corresponding to the one tap with communications terminals corresponding to taps disposed along the cable in a first direction toward the first termination. The second directional coupler couples the communications terminal corresponding to the one tap with communications terminals corresponding to taps disposed along the cable in a second direction toward the second termination. The first and second directional couplers interrupt the cable at the tap and each directional coupler introduces a fixed signal power loss through the cable, the power loss being substantially equal among all of the directional couplers. The apparatus is for equalizing the signal power level received at each of the N communications terminals and comprises means for attenuating signal power coupled between each one of the directional couplers and the corresponding communications terminal. The attenuating means provides a selectable power loss therethrough, wherein the selectable power loss is determined by N, by the ordinal number of a tap including the one directional coupler from that termination toward which the one directional coupler communicates, and by the fixed signal power loss introduced by each of the directional couplers through the cable.

IN THE DRAWING

FIG. 2 illustrates in greater detail a cable tap of FIG. 1 not adjacent a cable termination;

FIG. 3 illustrates in like detail a cable tap of FIG. 1 adjacent one cable termination.

Figure 1:
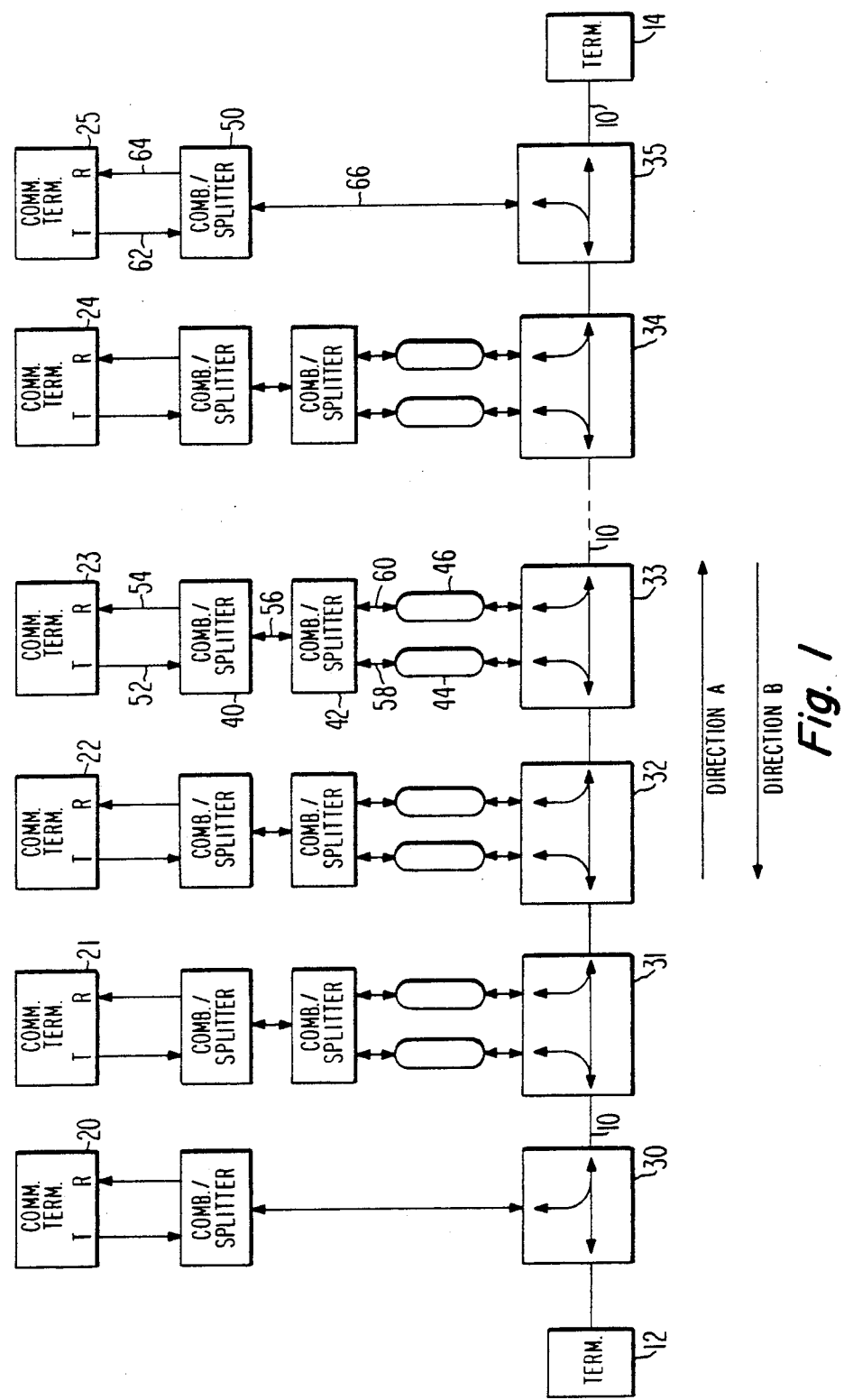
FIG. 1 illustrates in block diagram form the preferred embodiment of the present invention.

Referring to FIG. 1, there is shown the communications system of the present invention including a plurality of communications terminals 20 through 25 coupled to passive bus 10 via taps 30 through 35, respectively. In the system shown, cable 10 extends between terminations 12 and 14, which may typically be load devices exhibiting impedances of 50 ohms to ground.

In the discussion that follows, communications terminal 23 and the other devices coupled between it and cable 10 will be described as typical of all communications terminals coupled to cable 10 at a point not adjacent either termination 12 or 14. Likewise, communications terminal 25 and the other devices coupled between it and cable 10 will be described as typical of both communications terminals 20 and 25 coupled to cable 10 at points adjacent either termination 12 or 14.

Referring to both FIG. 1 and FIG. 2, in which identical elements are given like numerical designations, communications terminal 23 transmits signals into the system via signal lead 52. Device 40, which functions in this case as a combiner, receives the signal on lead 52 and couples it to lead 56. Device 42, functioning in this case as a splitter, receives the signal on lead 56 and couples it to both leads 58 and 60. Attenuators 44 and 46 provide a selectable signal power loss to the signals on leads 58 and 60, respectively. The amount of attenuation provided by attenuators 44 and 46 will be discussed in great detail in later paragraphs.

Referring specifically to FIG. 2, the signal attenuated by attenuator 44 is coupled to tap 33 via signal lead 74. Likewise, the signal attenuated by attenuator 46 is coupled to tap 33 via signal lead 76.

Tap 33 comprises two directional couplers 70 and 72. Directional couplers are well known in the art as devices which couple signals traveling in one direction only to a secondary system, while virtually ignoring a signal traveling in the opposite direction. The amount of coupling is ordinarily expressed in decibels of attenuation that the signal undergoes in passing through the coupling to the secondary system.

In a preferred embodiment of the present invention, one might select a directional coupler such as Model No. PDC-20-3, sold by Mini-Circuits Division of Scientific Components Corp. of Brooklyn, N.Y. This model includes a plurality of toroidal windings for sensing current and voltage, and operates over a frequency range of 0.2 to 250 MHz. Alternatively, one might use a directional coupler of the type described in U.S. Pat. No. 4,467,293, "FERRITE TYPE DIRECTIONAL COUPLER," issued Aug. 21, 1984, to T. R. Apel.

In the present example, directional couplers 70 and 72 are substantially identical devices, but configured such as to receive oppositely-directed signals transmitted along cable 10. Coupler 70 passes signal along cable 10, the primary transmission system (path 70a), with very little attenuation, typically one-half decibel. Coupler 70 also permits communications between terminal 23 and terminals whose cable taps are disposed along cable 10 in direction B (toward the left) with relatively small attenuation along path 70b, typically 10 db. However, coupler 70 effectively blocks communications between terminal 23 and terminals whose cable taps are disposed along cable 10 in direction A (toward the right), by exhibiting large attenuation along path 70c (shown as a dashed line) typically 50 db.

In a similar, but essentially opposite manner, directional coupler 72 passes signal along cable 10 (path 72a) with very little attenuation, typically one-half db. Coupler 72 also permits communications between terminal 23 and terminals whose taps are disposed along cable 10 in direction A with relatively small attenuation along path 72b, typically 10 db. However, coupler 72 effectively blocks communications between terminal 23 and terminals whose taps are disposed along cable 10 in direction B, by exhibiting large attenuation along path 72c (shown as a dashed line), typically 50 db.

A signal transmitted along cable 10 in direction A is received by tap 33 via directional coupler 70 where it passes through attenuator 44 to device 42. A signal transmitted along cable 10 in direction B is received by tap 33 via directional coupler 72 where it passes through attenuator 46 to device 42. In this instance, device 42 acts as a combiner, combining the signals on signal leads 58 and 60 onto a single lead 56. Device 40, acting in this instance s a splitter, receives the combined signal on lead 56 and splits the part received from cable 10 onto signal lead 54 where it is applied to the receiver portion of communications terminal 23.

It should be noted that each of the directional couplers 70 and 72 presents a loss of approximately one-half db to signals passing along cable 10. Thus, the insertion loss of tap 33 may be said to be approximately one db.

Turning now to communications terminal 25, as typical of a terminal whose tap is adjacent one of the terminations 12 or 14, terminal 25 transmits signals into the system via signal lead 62. Device 50, which functions in this case as a combiner, receives the signal on lead 62 and couples it to lead 66, where it enters cable 10 at tap 35.

Referring now both to FIG. 1 and FIG. 3, tap 35 comprises a single directional coupler 80. In the configuration shown, coupler 80 passes signal along cable 10 toward termination 14 via path 80a. Coupler 80 also permits communications between terminal 25 and the rest of the terminals in the system, all of them along direction B, via path 80b with relatively small attenuation, typically 10 db. However, coupler 80 effectively blocks signal communications between terminal 25 and termination 14 by exhibiting large attenuation along path 80c (shown as a dashed line), typically 50 db.

A signal transmitted along cable 10 in direction A is received by tap 35 via directional coupler 80, where it is passed along signal lead 66 to device 10, which functions in this instance as a splitter by coupling the signal onto lead 64. From there, the signal is applied to the receiver portion of communications terminal 25.

It is clearly seen that in communications between any two non-adjacent terminals in this system, the signal power is diminished by each intervening cable tap. In the present example, each intervening cable tap reduces signal power by one db. Thus, the signal received by a terminal from a terminal with an adjacent cable tap location will be 50 db greater than the signal received from a terminal having a cable tap spaced from the cable tap of the receiving terminal by fifty cable taps. Such a wide dynamic range is a very great burden on the receive subsystem of a communications terminal.

In accordance with the present invention, the signal power loss provided by selectable attenuators, typified by attenuators 44 and 46, is selected according to three parameters to virtually equalize the signal power level between any two communications terminals within the system of FIG. 1. The three parameters are the total number of communications terminals (i.e., cable taps) in the system, referred to as N; the cable insertion loss introduced by each directional coupler, referred to as L; and the ordinal number of the tap from the termination toward which the associated directional coupler communicates, referred to as I. The relationship for the attenuation, A, provided by each one of the attenuators is expressed as $$A = 2L\ (N-I).$$

By way of example, it may be assumed that the system of FIG. 1 has fifty communications terminals, wherein each directional coupler attenuates the signal along cable 10 by one-half db, and wherein communications terminal 23 is the fourth terminal from termination 12, and hence the 47th terminal from termination 14. According to the equation above, attenuator 44 would provide a signal drop of 46 db and attenuator 46 would provide a signal drop of 3 db.

It will be noted that no attenuator is associated with communications terminals 20 or 25, the terminals adjacent terminations 12 and 14. Applying the equation, it is seen that for these two terminals 20 and 25, N is equal to I, and hence A is equal to zero.

In order to demonstrate virtual equality of signal power level between any pair of communications terminals, computations for A will be made for pertinent selectable attenuators of three arbitrarily selected communications terminals, namely terminals denoted X, Y, and Z, having ordinal values of 10, 20 and 40, respectively, from the left, in a system where N=50, and where each directional coupler introduces a one-half db loss along cable 10. It is easily seen that in this system, the ordinal values of terminals X, Y, and Z, from the right, are 41, 31 and 11, respectively.

Figure 4:
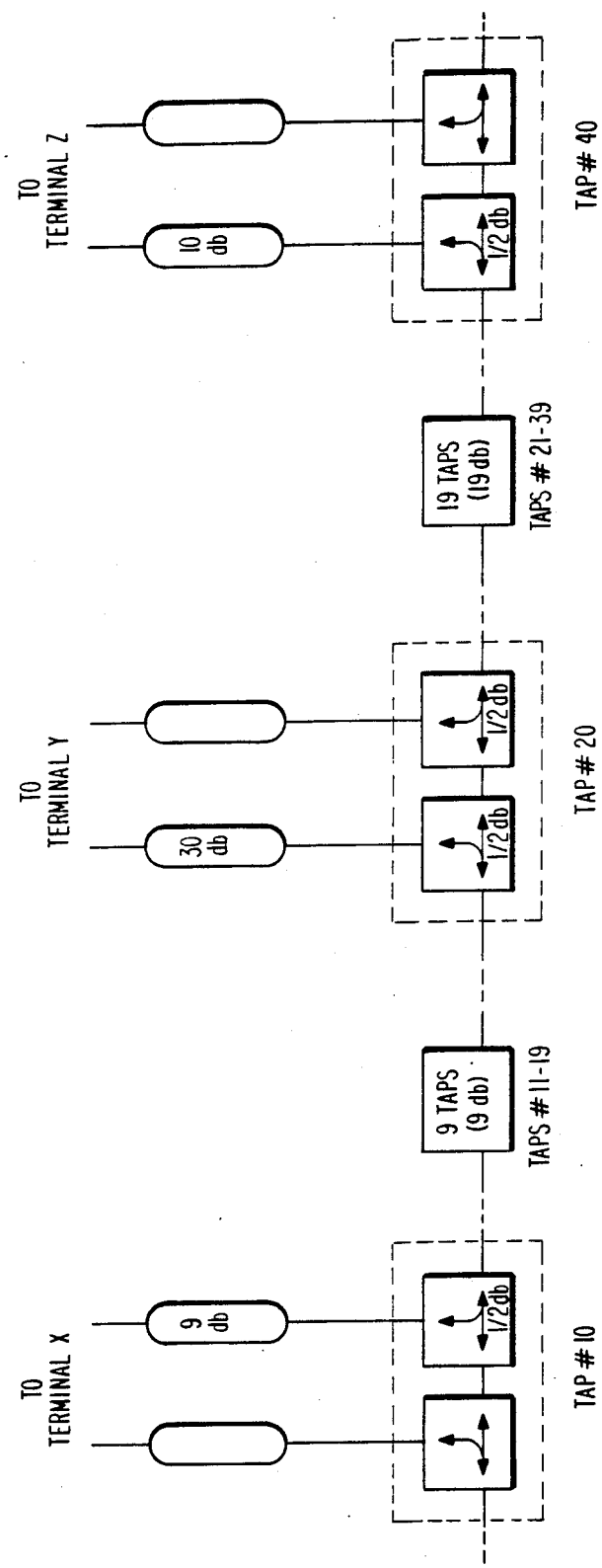
FIG. 4 depicts a portion of the system of FIG. 1 and is useful in illustrating a selected example.

Referring to FIG. 4, terminal X, in its communications in the direction toward terminals Y and Z, has an ordinal value of 41. Thus, using the equation above and the values specified in this example, A, the value of the selectable attenuator associated with that direction, is set at 9 db. Terminal Y, in its communications in the direction toward terminal X, has an ordinal value of 20. Hence, the value of A for its selectable attenuator associated with that direction is set at 30 db. Finally, terminal Z, in its communications in the direction toward terminal X, has an ordinal value of 40. Hence, the value of A for its selectable attenuator associated with that direction is set at 10 db.

The invention is proved by comparing the signal power level drops between terminals X and Y with those between X and Z, while disregarding the directional coupler drops between the cable and the terminals, which are constant for all interconnects. Considering first the X to Y path: the attenuator at X is set at 9 db, the nine taps between X and Y inject 9 db of loss, and the attenuator at Y is set at 30 db, for a total drop of 48 db. Considering next the X to Z path: the attenuator at X is set at 9 db, the 29 taps between X and Z inject 29 db of loss, and the attenuator at Z is set at 10 db, for a total drop of 48 db. It can be easily seen that, using the equation above to calculate all attenuator values, the total drop, including attenuator and cable tap drops, between any two terminals in the system will be 48 db.

Selectable incremental attenuators are well known in the art. See, for example, U.S. Pat. No. 4,442,325, "SWITCHABLE INCREMENTAL ATTENUATOR FOR TELEPHONE LINE INTERFACE," issued Apr. 10, 1984, to N. C. McDermott. The McDermott patent discloses an attenuator switchable between 0.1 and 32.5 db in increments of 0.1 db.

What is claimed is:

1. In a system for providing interconnections among N communications terminals, said system including a cable having first and second end terminations, and N taps serially interconnecting said cable between said end terminations for coupling said N communications terminals to said cable, wherein N−2 of said N taps are not adjacent said first or said second end terminations, each one of said N−2 taps comprising first and second directional couplers serially interconnected with each other and with said cable, said first directional coupler for coupling one of said communications terminals corresponding to said one of said N−2 taps to said cable for bidirectional communication with other communications terminals corresponding to taps disposed along said cable in a first direction toward said first end termination, said second directional coupler for coupling said one of said communications terminals corresponding to said one of said N−2 taps to said cable for bidirectional communication with other communications terminals corresponding to taps disposed along said cable in a second direction toward said second end termination, said first and second directional couplers being separately connected to said cable at said one of said N−2 taps and each directional coupler introducing a fixed signal power loss through said cable, said power loss being substantially equal among all of said directional couplers; an apparatus for equalizing the signal power level received at each of said N communications terminals, said apparatus comprising:

means for attenuating signal power coupled between each one of said directional couplers and said corresponding communications terminal, each of said attenuating means including a first and a second attenuator, said first attenuator being coupled between said first directional coupler and said corresponding communications terminal and said second attenuator being coupled between said second directional coupler and said corresponding communications terminal, said first and second attenuators providing a selectable signal power loss therethrough, wherein said selectable power loss is determined by N, by the ordinal number indicating the position of a tap including said one directional coupler counted from the end termination toward which said one directional coupler communicates, and by said fixed signal power loss introduced by each of said directional couplers through said cable.

2. The apparatus according to claim 1 wherein said selectable power loss, A, is determined by $$A = 2L(N-I),$$

where L is said fixed signal power loss introduced by each of said directional couplers, and I is said ordinal number of a tap including said one directional coupler.

3. The apparatus according to claim 1 further including means coupled to each of said attenuating means for combining the signal transmitted through said first attenuator coupled to said first directional coupler with the signal transmitted through said second attenuator coupled to said second directional coupler.

4. The apparatus according to claim 1 wherein said N taps include first and second end taps adjacent said first and second end terminations, respectively, and wherein each one of said two end taps includes a directional coupler for coupling a corresponding communications terminal to said cable for bidirectional communication with the other communications terminals.

5. A system for providing interconnections among N communication terminals comprising:

a cable having first and second end terminations;

N taps serially interconnecting said cable between said end terminations for coupling said N communications terminals to said cable, wherein N−2 of said N taps are not adjacent said first or said second end terminations;

each one of said N−2 taps comprising first and second directional couplers serially interconnected with each other and with said cable, said first directional coupler for coupling one of said communications terminals corresponding to said one of said N−2 taps to said cable for bidirectional communication with other communications terminals corresponding to taps disposed along said cable in a first direction toward said first end termination, said second directional coupler for coupling said one of said communications terminals corresponding to said one of said N−2 taps to said cable for bidirectional communication with other communications terminals corresponding to taps disposed along said cable in a second direction toward said second end termination, said first and second directional couplers being separately connected to said cable at said one of said N−2 taps and each directional coupler introducing a fixed signal power loss through said cable, said power loss being substantially equal among all of said directional couplers; and means for attenuating signal power coupled between each one of said directional couplers and said corresponding communications terminal, each of said attenuating means including a first and a second attenuator, said first attenuator being coupled between said first directional coupler and said corresponding communications terminal and said second attenuator being coupled between said second directional coupler and said corresponding communications terminal, said first and second attenuators providing a selectable signal power loss therethrough, wherein said selectable power loss is determined by N, by the ordinal number indicating the position of a tap including said one directional coupler counted from the end termination toward which said one directional coupler communicates, and by said fixed signal power loss introduced by each of said directional couplers through said cable.

6. The system according to claim 5 wherein said selectable power loss, A, is determined by $$A = 2L(N-I),$$

where L is said fixed signal power loss introduced by each of said directional couplers, and I is said ordinal number of a tap including said one directional coupler.

7. the system according to claim 5 further including means coupled to each of said attenuating means for combining the signal transmitted through said first attenuator coupled to said first directional coupler with the signal transmitted through said second attenuator coupled to said second directional coupler.

8. The system according to claim 5 wherein said N taps include first and second end taps adjacent said first and second end terminations, respectively, and wherein each one of said two end taps includes a directional coupler for coupling a corresponding communications terminal to said cable for bidirectional communication with the other communications terminals.

* * * * *